(12) United States Patent
Dowman

(10) Patent No.: US 6,792,758 B2
(45) Date of Patent: Sep. 21, 2004

(54) VARIABLE EXHAUST STRUTS SHIELDS

(75) Inventor: Steven W. Dowman, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 28 days.

(21) Appl. No.: 10/289,568

(22) Filed: Nov. 7, 2002

(65) Prior Publication Data

US 2004/0088989 A1 May 13, 2004

(51) Int. Cl.[7] ............................................... F02G 1/00
(52) U.S. Cl. ........................ 60/772; 415/142; 60/725; 60/39.091
(58) Field of Search ..................... 60/772, 39.5, 805, 60/779, 725, 39.091; 415/142, 211.2, 118, 119, 126

(56) References Cited

U.S. PATENT DOCUMENTS

| | | | | |
|---|---|---|---|---|
| 3,618,700 A | * | 11/1971 | Bond et al. ................. 181/219 |
| 3,820,628 A | * | 6/1974 | Hanson ...................... 181/214 |
| 4,288,202 A | * | 9/1981 | Buckmann .................. 415/142 |
| 4,436,481 A | * | 3/1984 | Linder ........................ 415/119 |
| 4,492,518 A | * | 1/1985 | Neal .......................... 415/142 |
| 4,820,117 A | * | 4/1989 | Larrabee et al. ............ 415/142 |
| 4,979,872 A | * | 12/1990 | Myers et al. ............... 415/142 |
| 4,987,736 A | * | 1/1991 | Ciokajlo et al. .............. 60/797 |
| 4,993,918 A | | 2/1991 | Myers |
| 5,104,286 A | | 4/1992 | Donlan |
| 5,292,227 A | * | 3/1994 | Czachor et al. .......... 415/209.3 |
| 5,518,366 A | | 5/1996 | Gray |
| 5,634,767 A | * | 6/1997 | Dawson ..................... 415/134 |
| 5,672,047 A | | 9/1997 | Birkholz |
| 6,375,416 B1 | * | 4/2002 | Farrell et al. ............... 415/119 |
| 6,439,841 B1 | * | 8/2002 | Bosel ......................... 415/142 |

* cited by examiner

Primary Examiner—Justine R. Yu
Assistant Examiner—William H. Rodriguez

(57) ABSTRACT

A gas turbine engine having an exhaust casing that includes a plurality of fairings that shield struts that are affixed to and extend between concentric rings. Each fairing has a moveable tail section that is adjusted during turbine operation to change the angle of attack of the exhaust gases to minimize vortex shedding and the corresponding vibrations that result.

12 Claims, 9 Drawing Sheets

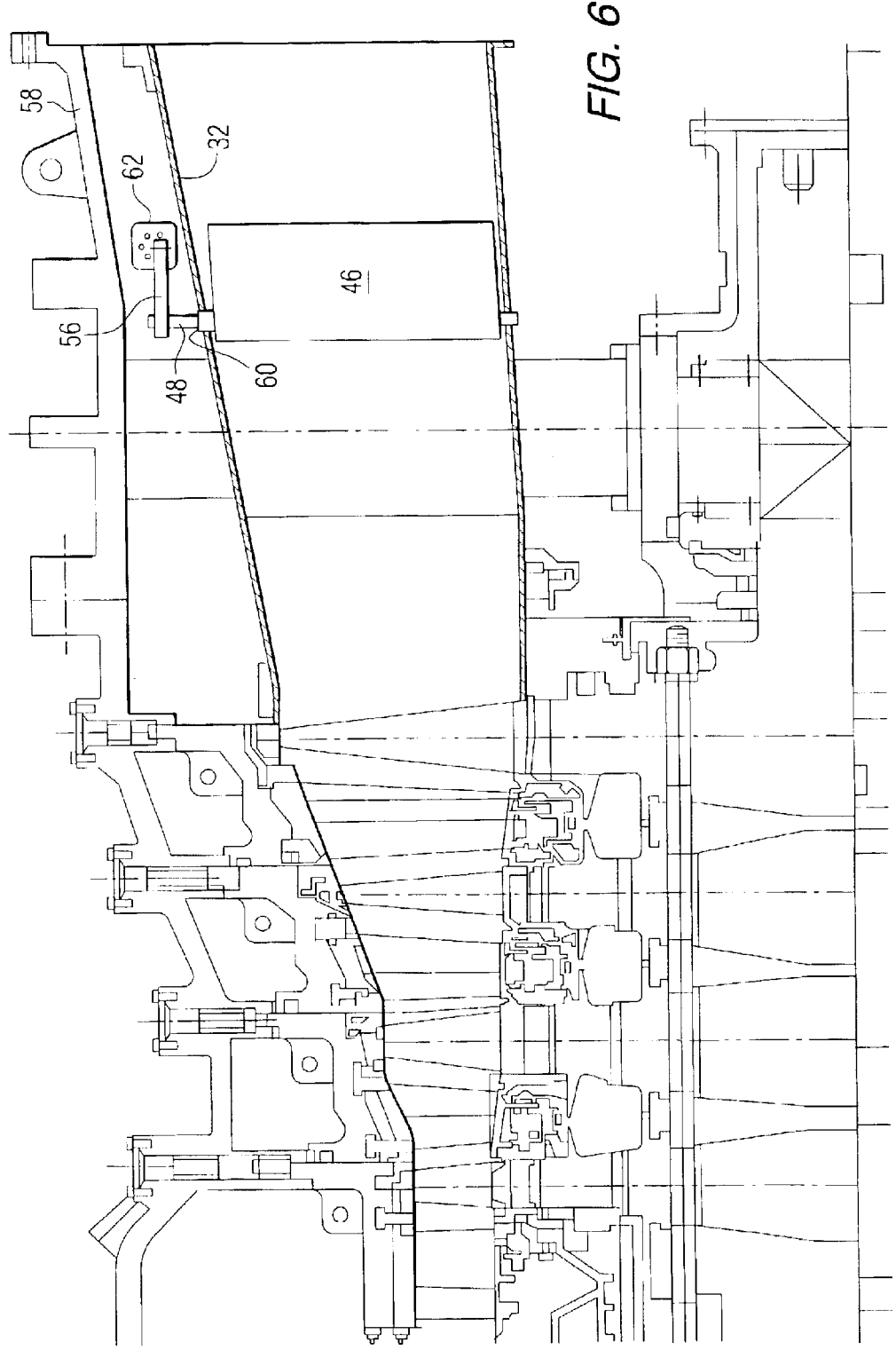

VARIABLE EXHAUST STRUTS SHIELDS

BACKGROUND OF THE INVENTION

1. Field of the Invention

This invention relates to gas turbine engines and, particularly, to the engine's exhaust case frame in the gas path.

2. Related Art

As is generally well known, gas turbine engines are continually undergoing changes with goals of improving performance, decreasing vibration and noise for a given load rating, while reducing cost and enhancing durability, producability and repairability. To improve performance, it is typical to increase the operating temperature of the engine since increased turbine temperatures improves the engine's efficiency and thus its performance. Of course, these increased temperatures necessitate other changes in the engine to handle the increased thermals so as to maintain structural integrity of the engine's components.

As is known, the durability of the turbine exhaust case and its struts that are disposed in the gas path dependent on the material selected if not shielded in some way. For this reason, in new turbines it is not uncommon to shield the struts by encapsulating them with an aerodynamic fairing. The cross-section of an exhaust strut shield resembles an airplane wing with a rounded leading edge tapering off to a near knife edge at the trailing lip. These "wing sections" are set at a fixed angle, in the axial direction of the rotor shaft.

The angle of attack or impingement of the exhaust flow at the location of the strut shields is not constant. The changing angle of attack creates vortex shedding vibrations as it passes over the exhaust strut shields. Extensive cracking has been observed in the exhaust diffusers of some combustion turbine units, which is likely due to excessive vibration from the transient affects of vortex shedding off the strut shields.

Accordingly, improved performance of the engine could be obtained if vortex shedding off the strut shields were reduced and preferably eliminated. Accordingly, it is an object of this invention to provide an improved fairing shield for the exhaust struts that minimizes vortex shedding.

It is a further object of this invention to provide such an improved strut fairing design that minimizes vortex shedding at all engine speeds.

SUMMARY OF THE INVENTION

The foregoing objects are achieved employing a gas turbine engine including a turbine exhaust case having a pair of concentrically-spaced rings and a plurality of extending, elongated struts interconnected and supported by the rings. The struts are supported downstream of a last row of rotating turbine blades. A fairing encapsulates at least one of the struts. The fairing is designed in the shape of an airfoil having a substantially rounded upstream end that tapers in the downstream direction to a more narrow profile than the upstream end when viewed from the corresponding edge. The airfoil is constructed to have an upstream, stationary, annular housing which substantially surrounds the strut within the annular portion thereof. The airfoil also has a downstream tail section substantially situated downstream of the strut and pivotal about an axis parallel to the elongated dimension of the strut. Means are included for changing the angle of the tail section of the fairing about its pivot axis, preferably while the engine is operating, to minimize vortex shedding.

Preferably, a control system is provided that changes the angle of the tail section of the fairing on-line in response to changes in engine parameters such as speed or vibration to minimize the vibration in the exhaust section of the engine. The tail sections of the fairings can be controlled to move individually or preferably they can be interconnected to move as a single unit so all the tail sections of the fairings are moved at the same time and are at the same angle to the upstream stationary fairing sections. In this way, vortex shedding can be minimized and engine vibration reduced.

BRIEF DESCRIPTION OF THE DRAWINGS

A further understanding of the invention can be gained from the following description of the preferred embodiments when read in conjunction with the accompanying drawings in which:

FIG. 6 is a schematic side view of the down stream end of the turbine section shown in FIG. 1 illustrating one embodiment of this invention wherein the exhaust fairings are individually operated by an actuation mechanism supported within the turbine housing;

DESCRIPTION OF THE PREFERRED EMBODIMENT

The preferred embodiments of the invention provide an exhaust strut shield having a tail section that can rotate to change the angle of impingement of the exhaust gas to reduce vortex shedding. Proper control of the angle of the tail section will thus minimize vibration and damage to the engine and thus reduce maintenance expense. The present invention is best appreciated through a brief description of the environment within a combustion turbine in which the exhaust case of this invention is employed.

Figure 1:
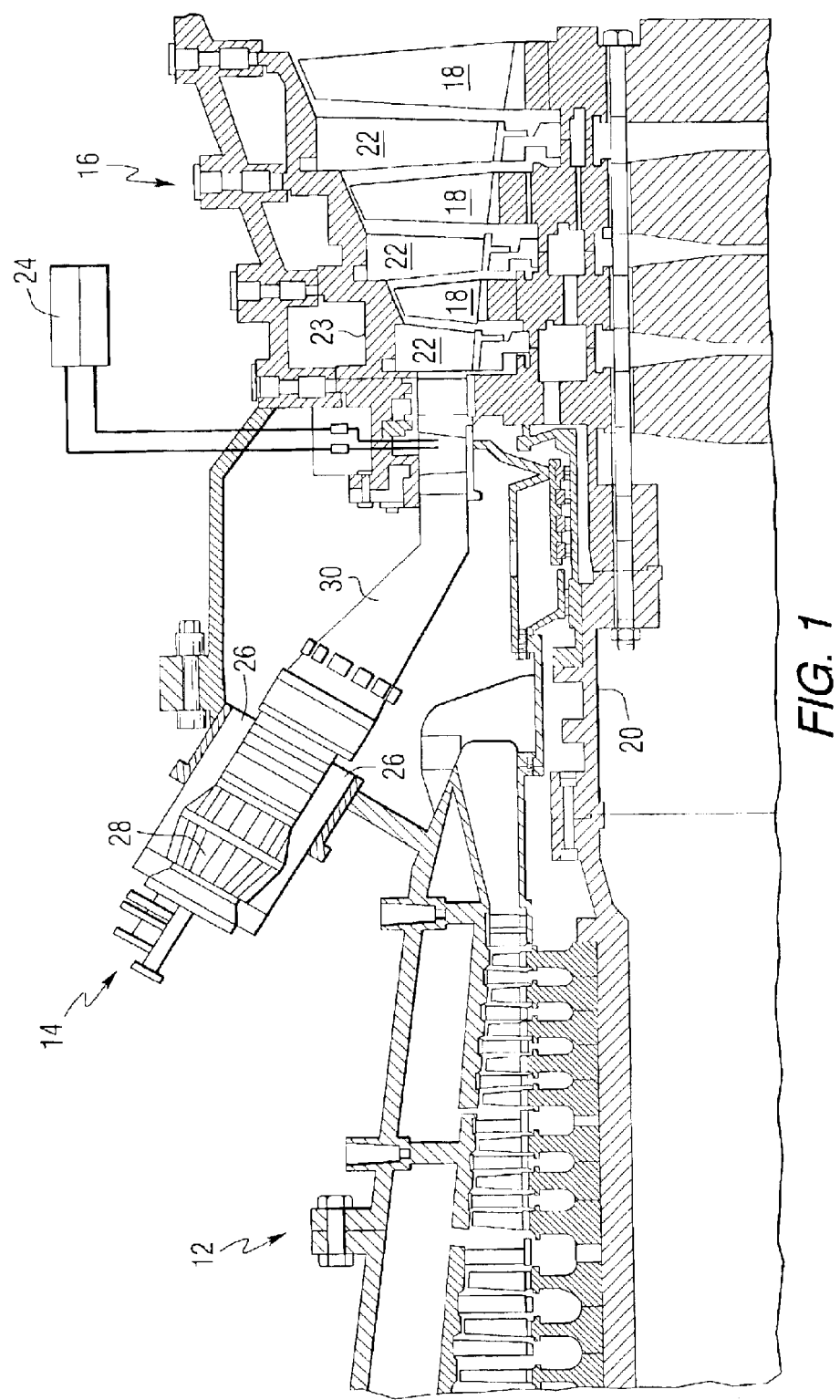
FIG. 1 is a cross-sectional view of a combustion turbine for which the exhaust case of this invention can be incorporated.

FIG. 1 illustrates a combustion turbine 10. The combustion turbine 10 includes a compressor 12, at least one combustor 14, and a turbine section 16. Typically, a plurality of combustors 14 are provided in a circular arc around the turbine shaft. The turbine section 16 includes a plurality of rotating blades 18 secured to a rotatable central shaft 20. A plurality of stationary vanes 22 are positioned upstream of the rotating blades 18, and are secured to a turbine cylinder 23. The vanes 22 are dimensioned and configured to guide the working gas over the blades 18.

In operation, air is drawn in through the compressor 12, where it is compressed and driven towards the combustor 14. The compressed air enters the combustor through an air intake 26. From the air intake 26, the air will typically enter the combustor at a combustor entrance 28, where it is mixed with fuel. The combustor 14 ignites the fuel/air mixture, thereby forming a working gas. The working gas is created typically at a temperature approximately equal to 2,500° F. to 2,900° F. (1,371° C.–1,593° C.). The gas expands through a transition member 30 and through the turbine 16, being guided by the vanes 22 to drive the rotating blades 18. As the gas passes through the turbine 16, it rotates the blades 18 which, in turn, drive the shaft 20, thereby transmitting usable mechanical work through the shaft 20. The combustion turbine 10 also includes a cooling system 24 dimensioned and configured to supply a coolant, for example, steam or compressed air, to internally cool the blades 18 and vanes 22 and other turbine components.

Figure 2:
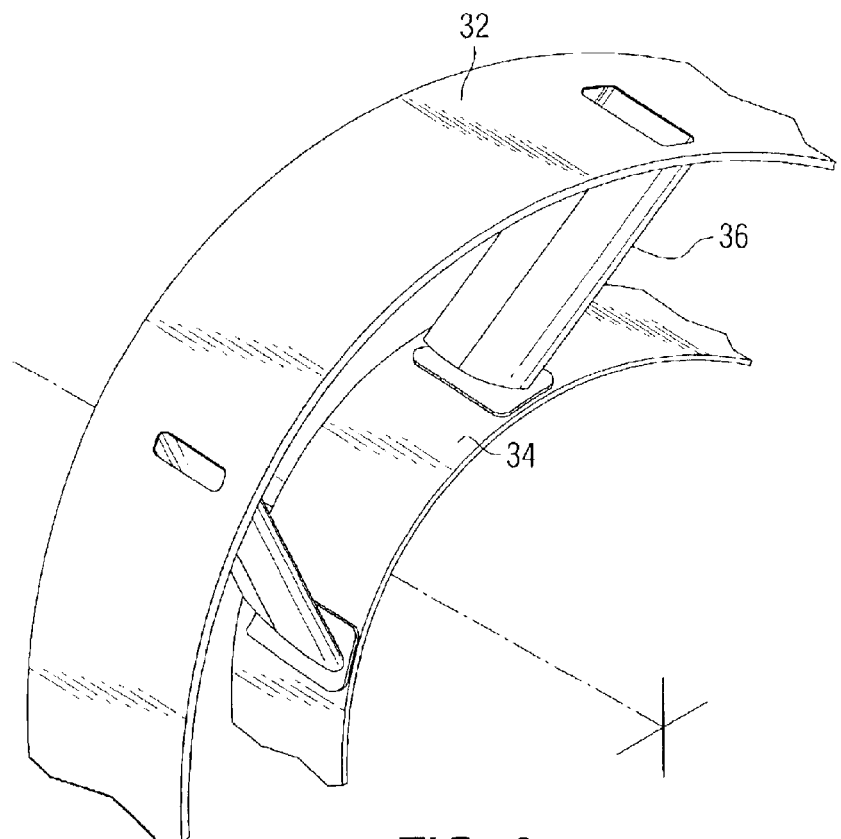
FIG. 2 is a partial view in perspective showing an assembled fairing for a turbine exhaust case, viewed from the upstream side of the fairing.

The exhaust case of this invention is positioned downstream of the last row of rotating blade 18 shown in FIG. 1. A perspective view of a partial section of the exhaust case of this invention is illustrated in FIG. 2, which shows a pair of spaced rings (diffusers) 32 and 34 concentrically supported by a plurality of extending fairings 36. The extending fairings interconnect and support the rings 32 and 34 downstream of the last row of rotating blades 18.

Figure 2A:
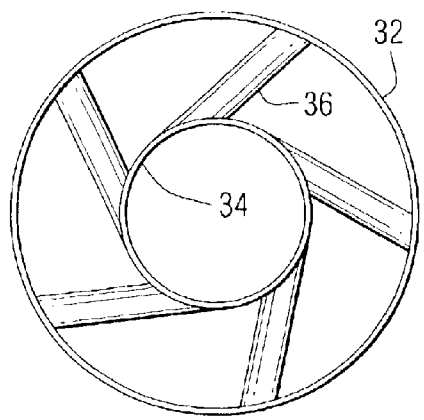
FIG. 2A is a schematic front view of the exhaust casing of this invention, wherein the fairings extend tangentially.
Figure 2B:
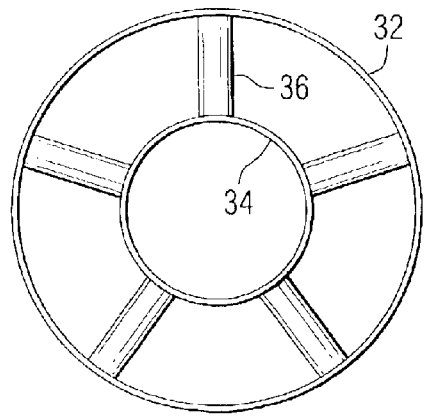
FIG. 2B is a schematic front view of a second embodiment of this invention wherein the fairings extend radially.

FIG. 2A shows a schematic rear view of the exhaust case of this invention from which it can be better appreciated that the fairings 36 can extend tangentially or radially from the inner ring 34 to the outward ring 32 where they are welded at each end to the corresponding ring. It should be appreciated that alternate means of attachment of the fairings to the rings can be employed, e.g., bolting. The struts 38 actually extend through the rings 32 and 34 and are connected at the outward ends to the turbine cylinder 23 and at the inward ends to the bearing housing that rotatably supports the turbine shaft 20. FIG. 2B shows an alternate embodiment in which the fairings 36 extend radially.

Figure 3:
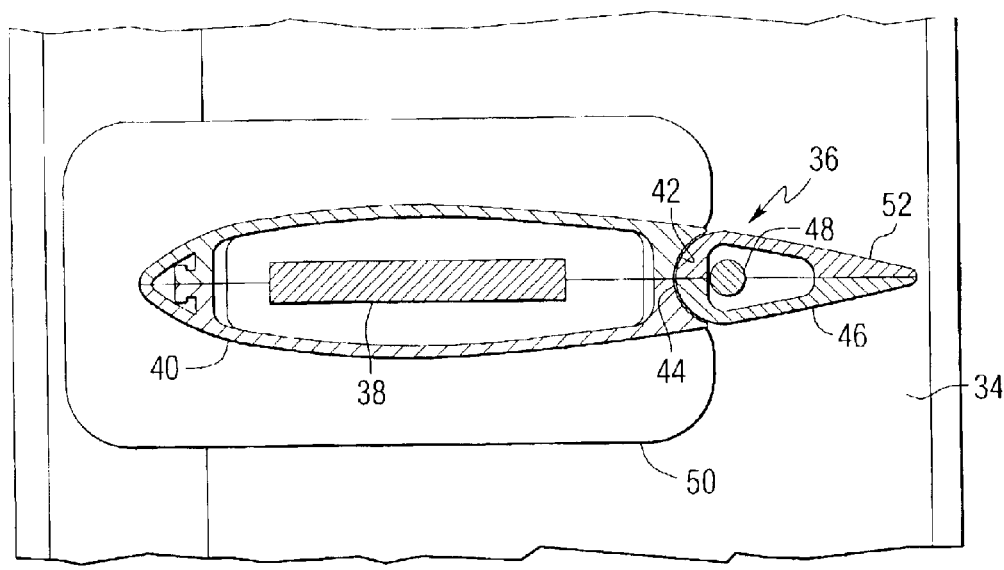
FIG. 3 is an overhead sectional view showing a fairing assembled on a strut mounted on the inner ring.

A top sectional view of the strut 38 and fairing 36 taken along a line just below the top ring 32 is illustrated in FIG. 3. The stationary portion 40 of the fairing 36 is shown completely surrounding the strut 38, though it should be appreciated that the trailing edge of the strut can be shielded by the moveable tail section 46 and need not be fully enclosed by the stationary portion of the fairing 40. The upstream end or male socket 44 of the moveable tail section 46 of the fairing 36 is rounded to mate with the female socket 42 in the downstream end of the stationary portion 40 of the fairing 36. The moveable tail section 46 pivots about pivot rod 48 as will be better appreciated from the description of FIGS. 4 and 5. The moveable tail section 46 narrows at its downstream end 52.

Figures 4, 5:
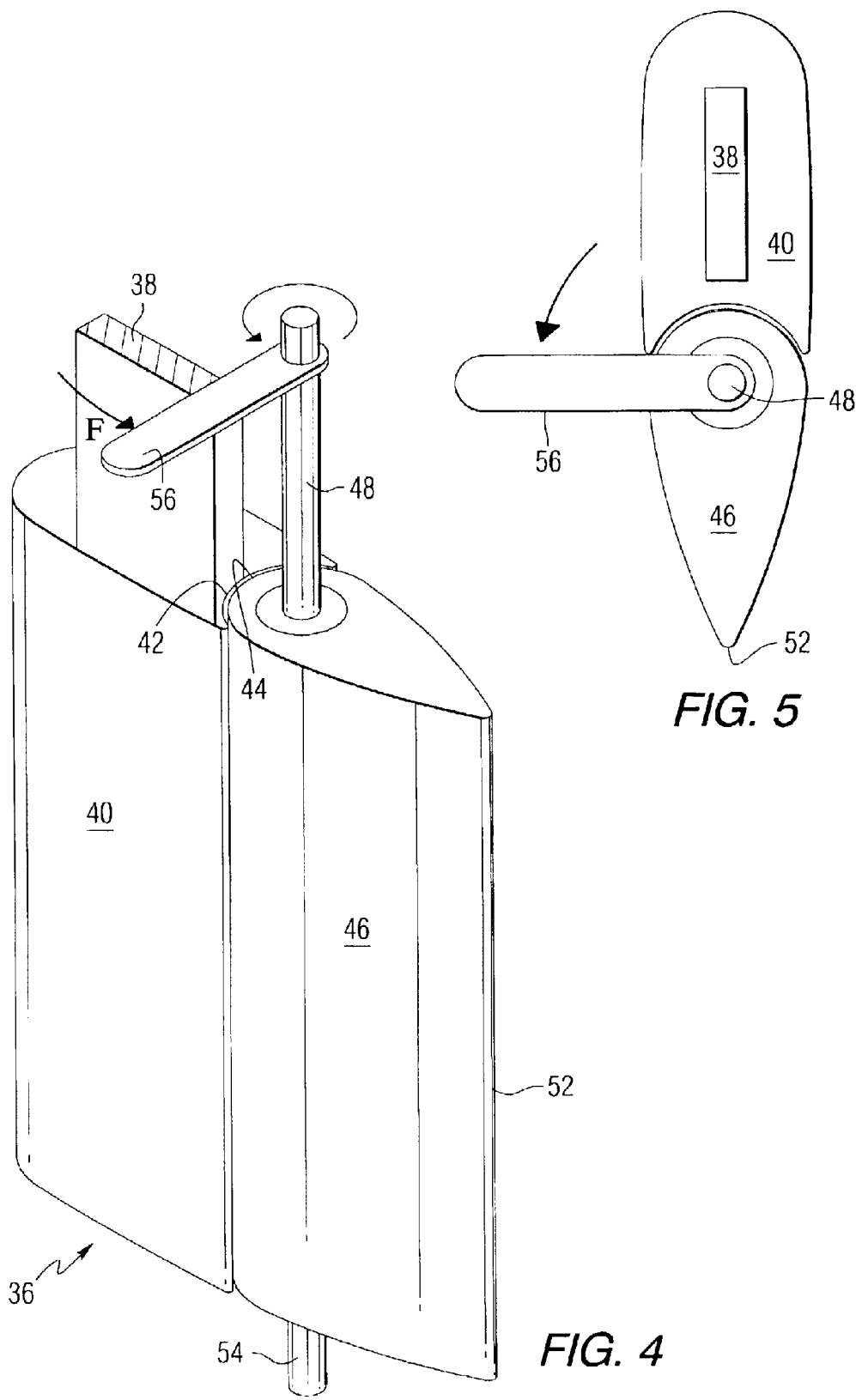
FIG. 4 is a perspective view of the fairing of this invention having the stationary portion encapsulating the strut, with the concentric rings not shown.
FIG. 5 is a top view of FIG. 4.

Referring to FIGS. 4 and 5, the fairing 36 is shown in perspective with a pivot pin 54 extending from its underside, which is captured in a corresponding hole in the inner ring 34 not shown. The pivot rod 48 is fixedly attached to and extends above the moveable tail section 46 through the outer ring 32, also not shown, and is connected to an actuator linkage 56. A force exerted on the actuator linkage 56 will cause the moveable tail section 46 to rotate about its pivot 48, 54. It should be appreciated that the pivot rod 48 can extend entirely through the moveable tail section 46 and terminate within the pivot pin 54 seat through the inner ring 34 or the pivot rod 48 can be a completely separate part from the pivot pin 54.

Figure 7:
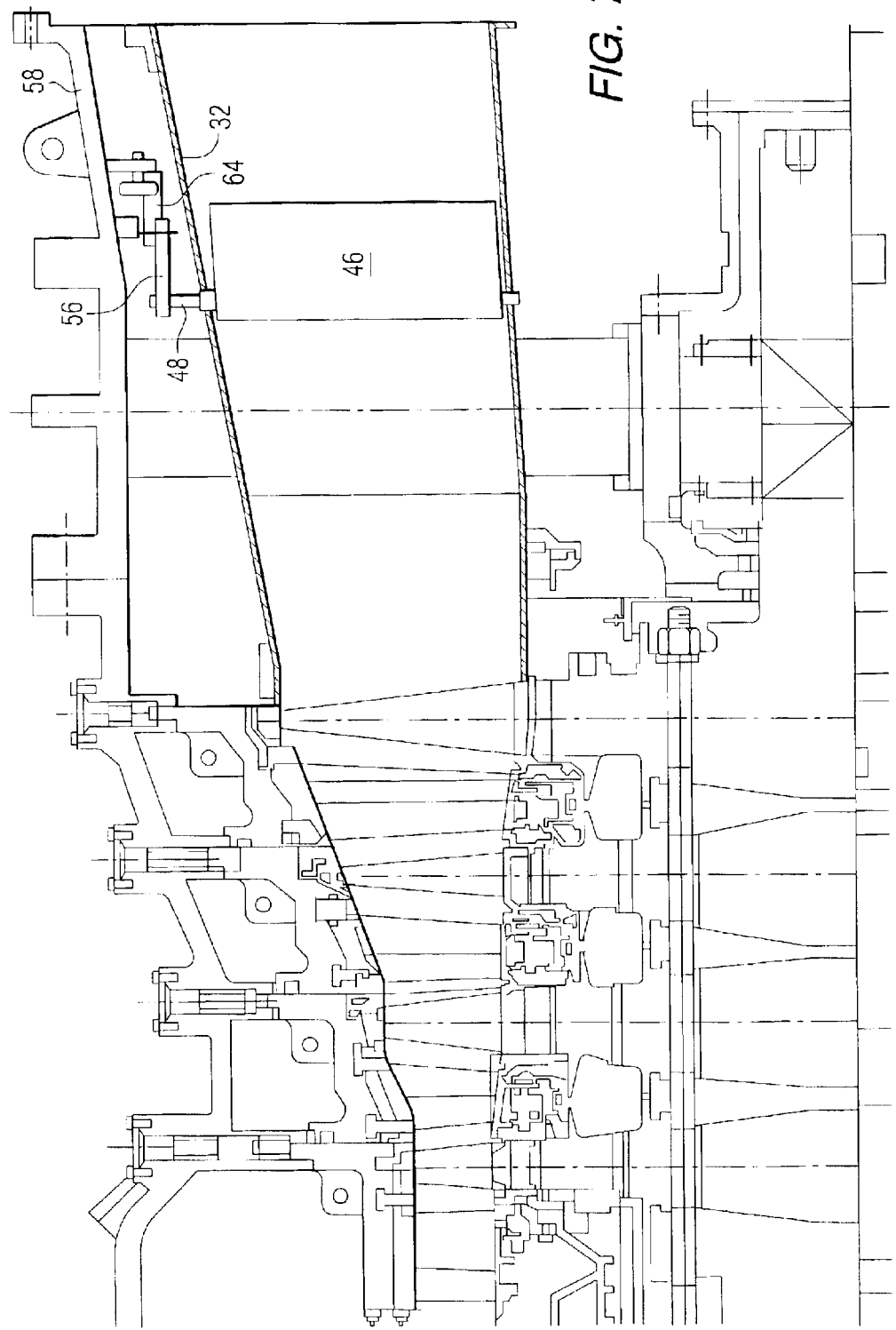
FIG. 7 is a schematic side view of the down stream end of the turbine section shown in FIG. 1 illustrating a second embodiment of this invention wherein the exhaust fairings are operated as a group by a synchronizing ring supported within the turbine housing.

FIG. 6 illustrates that the pivot rod 48 extends through a bushing 60 where it is connected on the opposite side of the outer ring 32 to the actuator linkage 56 which couples the moveable tail section 46 to an actuator coupling 62. The actuator coupling 62 can be connected directly to a corresponding actuator, such as a remotely controlled hydraulic piston actuator, so that each moveable tail section 46 is operated individually. The actuator is supported between the outer ring 32 and the turbine housing 58, preferably by the turbine housing. Alternately, as shown in FIG. 7, a synchronizing ring 64 can be employed. The synchronizing ring 64 is positioned radially outward from and concentric to the outer ring or shroud 32. The operation of the synchronizing ring shown in FIG. 7 can better be appreciated from FIG. 10, which shows a front view of the turbine arrangement of FIG. 9 more fully described hereafter. The only difference between the turbine arrangement of FIG. 7 and that shown in FIG. 10 is that in the FIG. 10 arrangement, the upper pivot rods 48 extend through the turbine casing 58 and are connected to the synchronizing ring 64 which is supported outside and around the turbine casing 58. The distal end of a piston rod of a hydraulic actuator 66 is pivotably attached to one end of a drive link 68 by a pivot pin 72, while the other end of the drive link 68 is pivotably attached to the synchronizing ring 64 by a fastener 70. The cylinder of the actuator 66 can be supported by the turbine housing 58. Thus, one direction of movement of the piston of the actuator 66 rotates the synchronizing ring 64 in a first direction, which in turn rotates the tail section 46 of the fairing 36 in one direction. In the same manner, the other direction of movement of the piston of the actuating means 66 rotates the synchronizing ring 64 in the opposite direction and causes the tail section 46 of each fairing 36 to rotate in the opposite direction.

Figure 8:
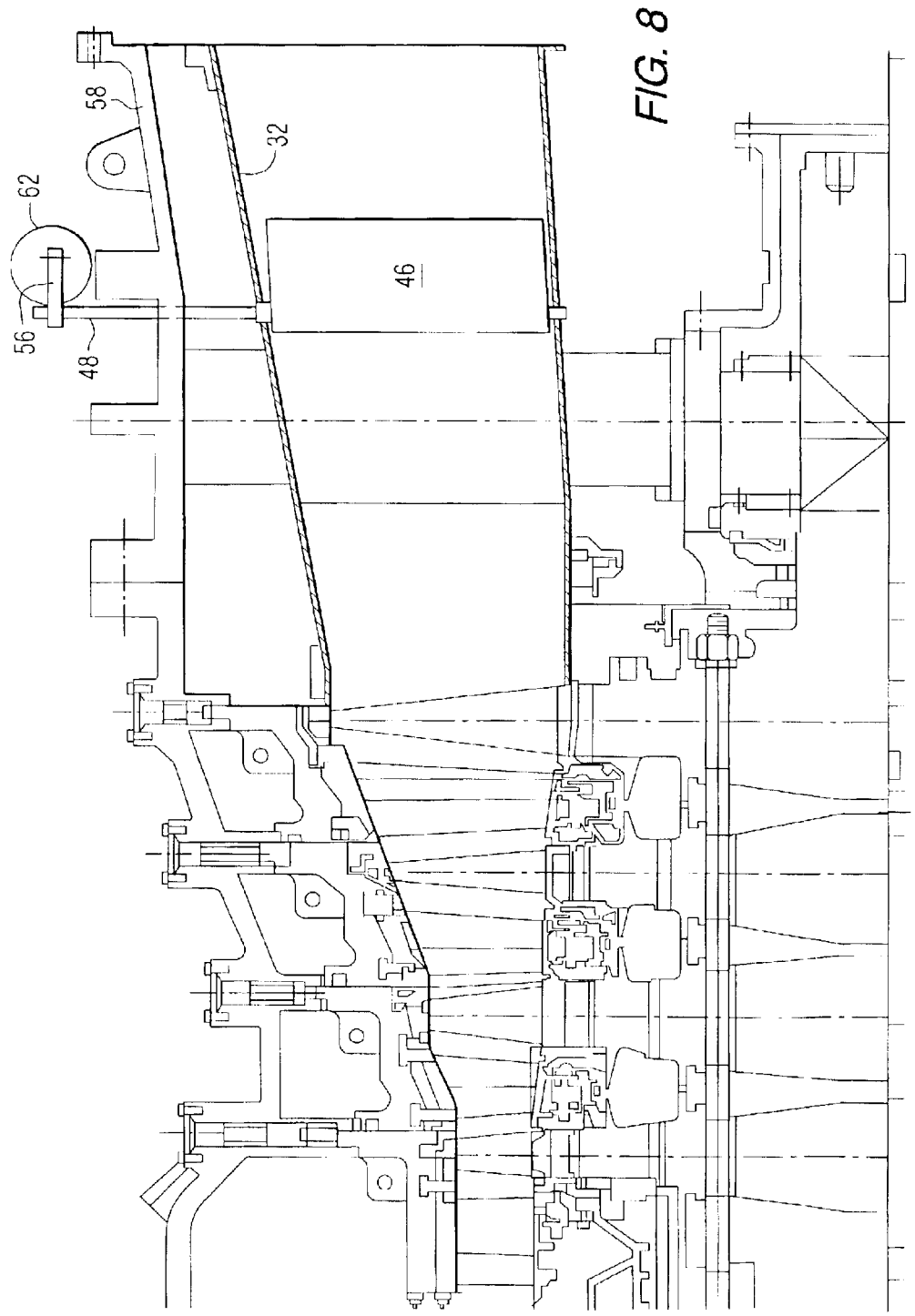
FIG. 8 is a schematic side view of the down stream end of the turbine section shown in FIG. 1 illustrating a third embodiment of this invention wherein the exhaust fairings are individually operated by an actuation mechanism supported outside the turbine housing.

FIG. 8 illustrates a drive arrangement, which is a variation of that shown in FIG. 6, where each fairing tail section 46 is individually driven. In the arrangement shown in FIG. 8, the upper pivot rod 48 extends through the turbine housing and the actuator 62 is supported outside the turbine housing.

Figure 9:
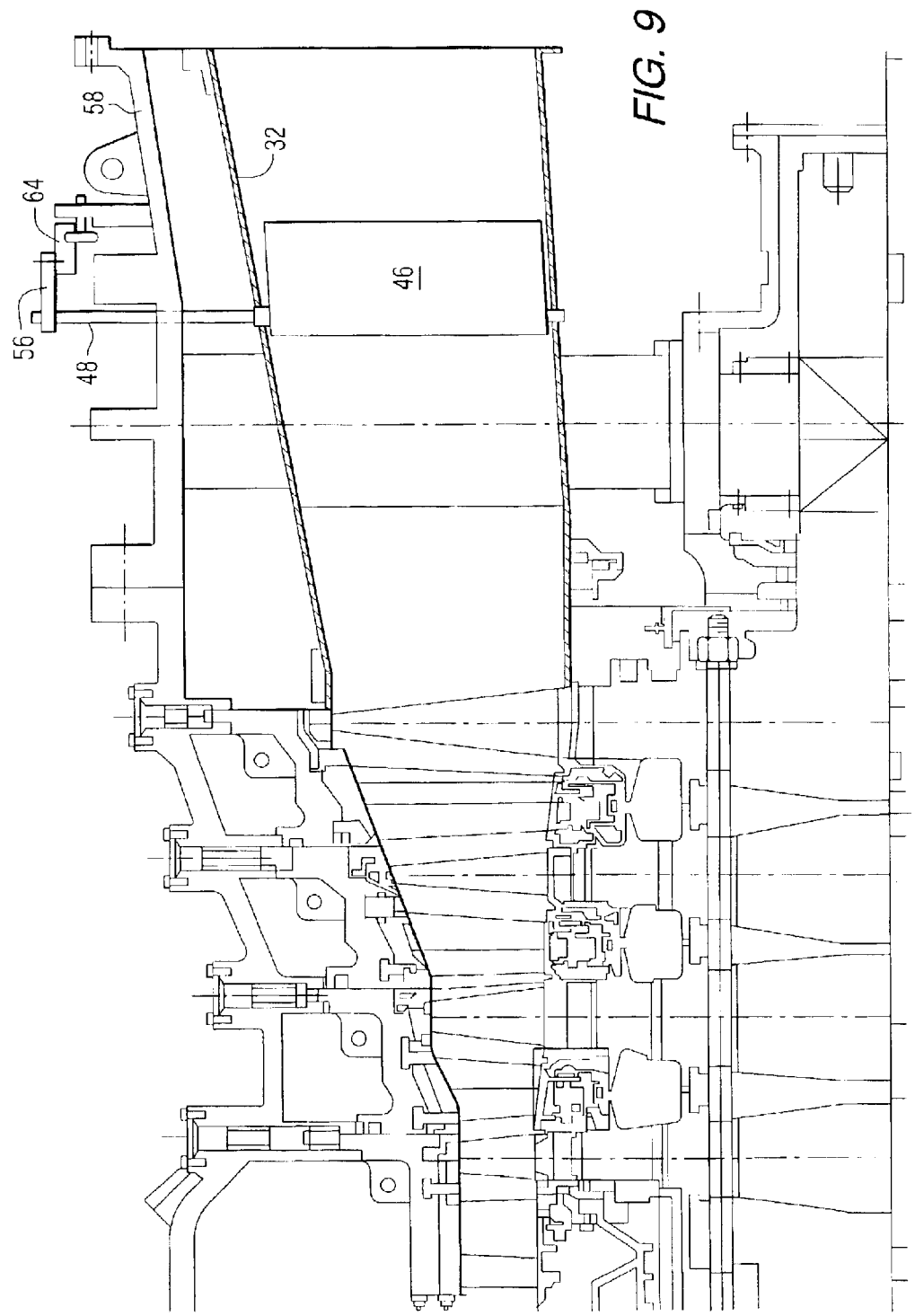
FIG. 9 is a schematic side view of the down stream end of the turbine section shown in FIG. 1 illustrating a fourth embodiment of this invention wherein the exhaust fairings are operated as a group by a synchronizing ring supported outside the turbine housing.
Figure 10:
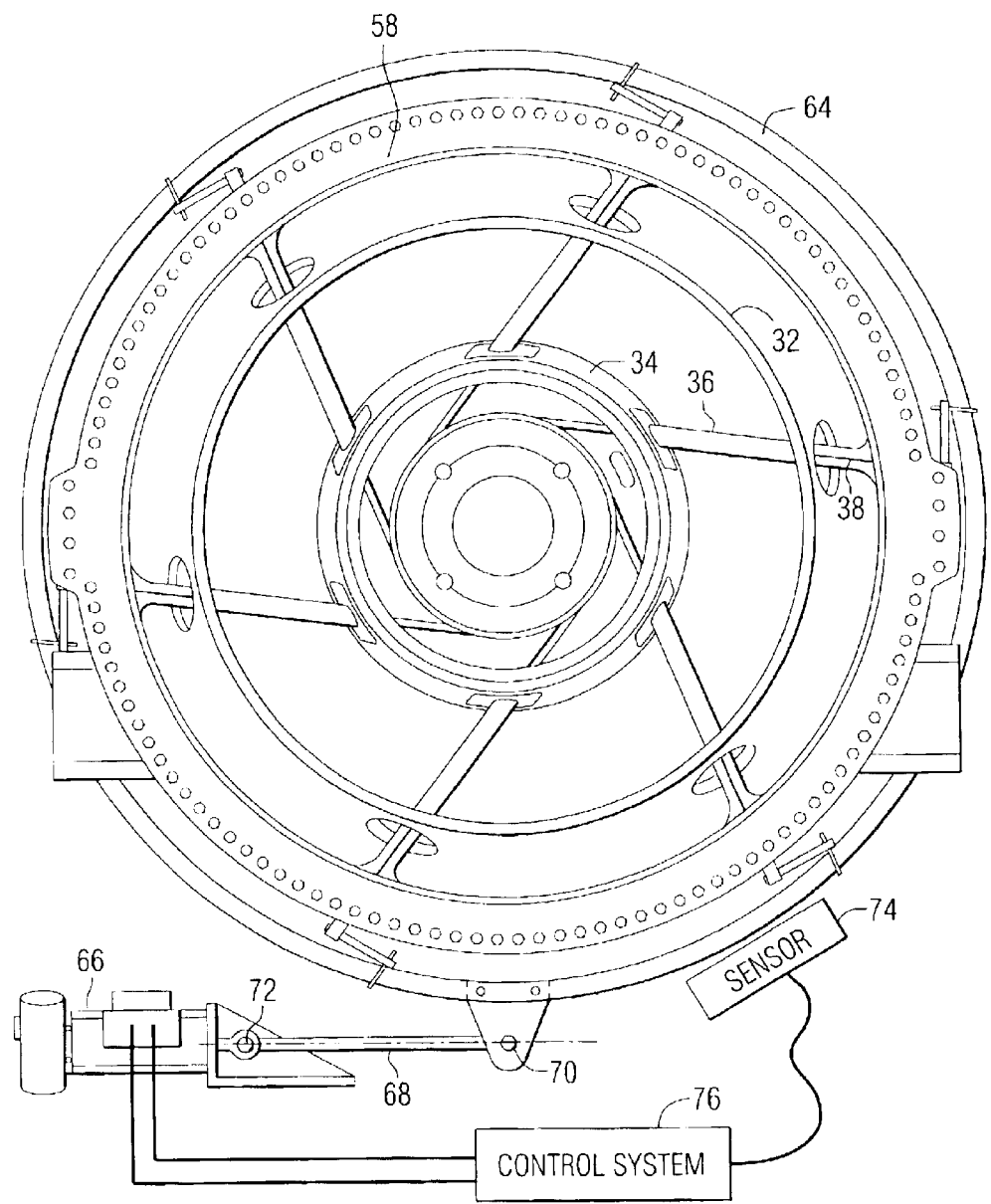
FIG. 10 is a schematic front view of the exhaust casing of this invention shown in FIG. 9.

FIG. 9 illustrates a variation of the actuation arrangement shown in FIGS. 7 and 8 where the upper pivot rod 48 extends through the turbine housing and synchronizing ring 64 is positioned outside of the turbine. In all other respects, the arrangement shown in FIG. 9 functions the same as that shown in FIG. 7.

In operation, a sensor represented by block 74, shown in FIG. 10, will monitor a parameter of the turbine such as speed and/or vibration. When a predetermined incremental change in the vibration monitored is noted, then the control system 76 commands the hydraulic actuator to move the tail section 46 of the fairing 36 through a given arc, preferentially in incremental steps. The level of vibration at each of the incremental steps is noted and the hydraulic actuator is given the command to return the moveable tail section 46 back to the step exhibiting the lowest vibration. This process can be repeated every time there is an incremental change in the level of vibration above a predetermined value or the speed of the turbine is changed by more than a specified number. In this way, the angle of attack of the exhaust gases on the fairing tail section can be varied to minimize engine vibration resulting from vortex shedding and thus prevent the cracking that has been experienced in some engine exhaust diffusers.

Alternately, the control system can be programmed to move the tail section of a fairing a step in either direction, identify which step exhibits the least vibration and continue stepping in that direction until an increase in vibration is noted or a step limit is reached. The control system would then back off the moveable tail section one step. If, in taking the initial step, an increase in vibration is noted in each direction, then the control system would return the moveable fairing tail section to its initial position.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A gas turbine engine having a turbine exhaust case comprising:
   a pair of concentrically spaced rings;
   a plurality of fairings extending between the rings, interconnecting and supporting said rings, said fairings supported downstream of a last row of rotating blades and comprising an airfoil having a substantially rounded upstream end that tapers in the downstream direction to a more narrow profile than the upstream end when viewed from a corresponding edge, said airfoil having an upstream, stationary housing and a movable downstream tail section pivotal about an axis parallel to the dimension of said fairing extending between said rings; and
   means for changing the angle of the tail section of said fairing about its pivot axis.

2. The gas turbine engine of claim 1 wherein said means for changing the angle of the tail section adjusts the angle on line with the turbine running.

3. The gas turbine engine of claim 2 including:
   a control system for controlling the means for adjusting the angle of the tail section;
   a vibration monitor for monitoring the vibration of the engine and providing an output indicative of the monitored vibration to the control system; and
   wherein the control system calibrates the tail section angle of least vibration by varying the angle of the tail section until the control system encounters an angle that exhibits the least vibration.

4. The gas turbine engine of claim 3 wherein the control system monitors changes in speed of the engine and for a given change in speed the control system re-calibrates the angle of least vibration.

5. The gas turbine engine of claim 3 wherein the control system controls each fairing independently and includes a vibration sensor within the vicinity of each fairing that the control system is controlling and adjusts the angle of the tail section of the fairing according to the output of the corresponding vibration sensor.

6. The gas turbine engine of claim 1 wherein said means for changing the angle of the tail section independently adjusts the tall section on each fairing.

7. The gas turbine engine of claim 1 wherein said means for changing the angle of the tail section adjusts each tall section to the same angle.

8. The gas turbine engine of claim 1 wherein the means for changing the angle of the tail section adjusts the angle of the tail section as a function of engine speed.

9. A method of operating a gas turbine that has a plurality of failings that extend between two concentric rings on an exhaust case, wherein a downstream tail section of at least one fairing is angularly pivotable about an axis parallel to the dimension of said fairings extending between said rings, including the step of controlling the angle of pivot of the tail section as a function of an operating parameter of the engine.

10. The method of claim 9 wherein the parameter of the engine is engine speed.

11. A method of operating a gas turbine that has a plurality of fairings that extend between two concentric rings on an exhaust case, wherein a downstream tail section of at least one fairing is angularly pivotable about an axis parallel to the dimension of said fairings extending between said rings, including the step of controlling the angle of pivot of the tail section as a function of an operating parameter of the engine, wherein the parameter of the engine is engine vibration.

12. The method of claim 11 wherein the controlling step comprises the steps of:
   moving the tall section about the pivot over a given arc;
   monitoring the vibration at substantially each point of movement across the arc;
   correlating the monitored vibration to the corresponding angle of the tail section; and
   determining the angle of the tail section that exhibits the least vibration.

* * * * *